United States Patent
Dyle

(10) Patent No.: US 9,457,696 B2
(45) Date of Patent: Oct. 4, 2016

(54) CONSOLE ASSEMBLY

(71) Applicant: GM GLOBAL TECHNOLOGY OPERATIONS LLC, Detroit, MI (US)

(72) Inventor: Taryn E. Dyle, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/529,628

(22) Filed: Oct. 31, 2014

(65) Prior Publication Data
US 2016/0121767 A1 May 5, 2016

(51) Int. Cl.
*B60N 2/46* (2006.01)
*B60R 7/04* (2006.01)

(52) U.S. Cl.
CPC ........... *B60N 2/4626* (2013.01); *B60N 2/4686* (2013.01); *B60R 7/04* (2013.01)

(58) Field of Classification Search
CPC .... B60N 2/46; B60N 2/4606; B60N 2/4626; B60N 2/464; B60N 2/4646; B60N 2/4686; B60R 7/00; B60R 7/04
USPC ................ 296/1.09, 24.34, 24.46, 37.8, 153; 297/115
See application file for complete search history.

(56) References Cited

U.S. PATENT DOCUMENTS

| 8,100,454 | B2 * | 1/2012 | D'Alessandro | ........... B60R 7/04 296/37.8 |
| 8,925,989 | B2 * | 1/2015 | Appelboum | .............. B60R 7/04 296/24.34 |
| 2010/0259074 | A1 * | 10/2010 | Gerhardt | .............. B60N 2/4613 297/115 |

FOREIGN PATENT DOCUMENTS

| DE | 4004084 A1 * | 8/1991 | ............. B60N 2/466 |
| FR | 2877615 A1 * | 5/2006 | ............. B60N 2/464 |

OTHER PUBLICATIONS

English Translation of DE 40 04 084; retreived Aug. 27, 2015 via PatentTranslate at www.epo.org.*
English Translation of FR 2,877,615; retreived Aug. 27, 2015 via PatentTranslate at www.epo.org.*

* cited by examiner

*Primary Examiner* — Jason S Daniels
(74) *Attorney, Agent, or Firm* — Quinn Law Group, PLLC

(57) ABSTRACT

A console assembly generally includes a console body and an armrest movably coupled to the console body. The console body defines an interior console cavity. The armrest can rotate relative to the console body about an axis of rotation between a closed, locked position and an open, unlocked position. Moreover, the armrest can move linearly relative to the console body between the open, unlocked position and an open, locked position. In the closed, locked position, the armrest covers the interior console cavity of the console body. When the armrest is in the open, unlocked position, the interior console cavity is accessible. When the armrest is in the open, locked position, the interior console cavity is accessible and the armrest is locked to the console body.

19 Claims, 3 Drawing Sheets

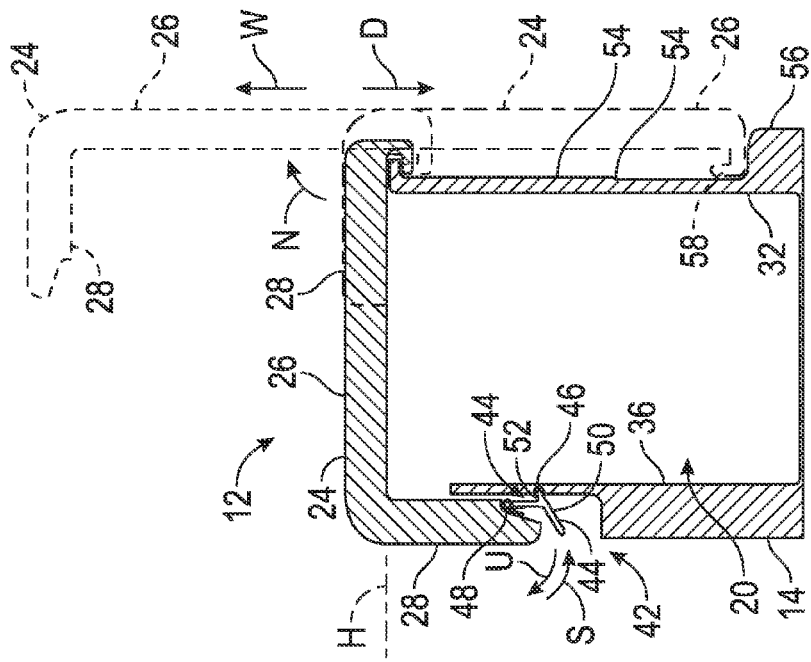
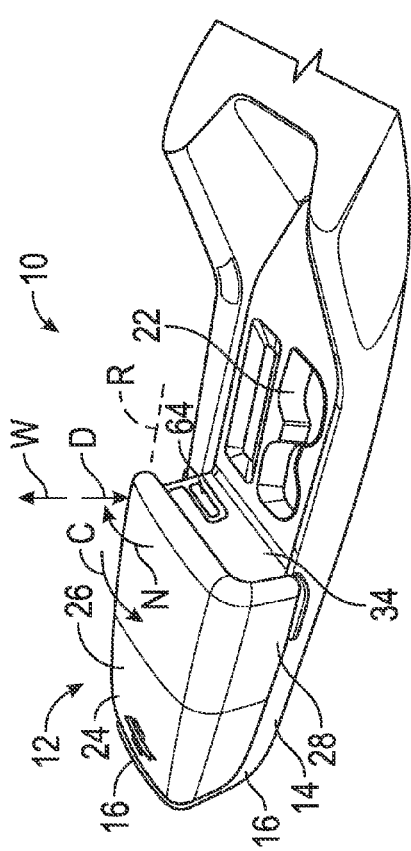
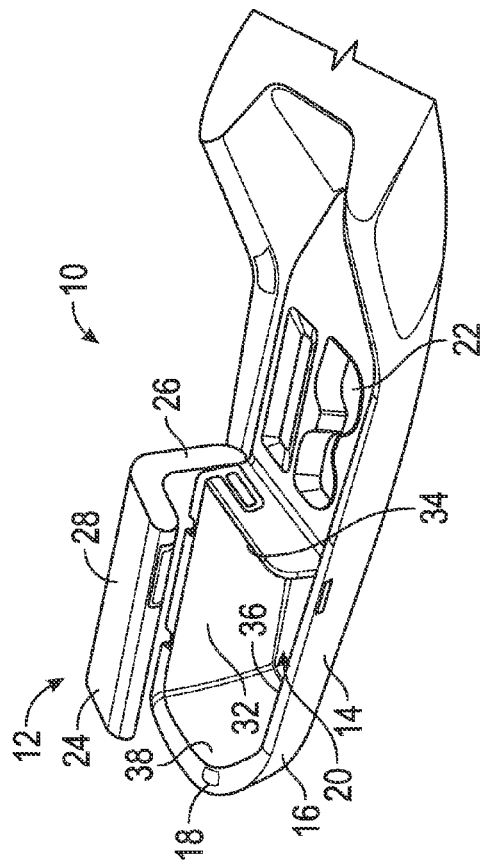
FIG. 1
FIG. 2
FIG. 3

CONSOLE ASSEMBLY

TECHNICAL FIELD

The present disclosure relates to a console assembly for a vehicle.

BACKGROUND

Some vehicles include a center console positioned between a driver seat and a passenger seat. The center console defines a storage compartment with an opening through which an occupant of the vehicle can access the storage compartment.

SUMMARY

A center console sometimes includes a lid that serves as an armrest so long as the lid is in the closed position. However, when the lid is in the open position and provides access to the console storage compartment, the lid cannot be used as an armrest. It is therefore useful to develop a console assembly with a lid that can function as an armrest regardless of whether the lid is in the open position or the closed position. The present disclosure relates to a console assembly with an armrest that can support a vehicle occupant's arm either when the armrest is in the closed position or the open position. When the armrest is in the open position, one vehicle occupant can have access to console storage compartment, while another occupant can rest the arm on the armrest.

In an embodiment, the console assembly generally includes a console body and an armrest movably coupled to the console body. The console body defines an interior console cavity. The armrest can rotate relative to the console body about an axis of rotation between a closed, locked position and an open, unlocked position. Moreover, the armrest can move linearly relative to the console body between the open, unlocked position and an open, locked position. In the closed, locked position, the armrest covers the interior console cavity of the console body, thereby preventing the vehicle occupants from accessing the interior console cavity. When the armrest is in the open, unlocked position, the interior console cavity is accessible. When the armrest is in the open, locked position, the interior console cavity is accessible and the armrest is locked to the console body. The present disclosure also relates to a vehicle including the console assembly described above.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic perspective view of a console assembly of a vehicle, including a console body and an armrest in a closed position;

FIG. 2 is a schematic perspective view of the console assembly of FIG. 1, depicting the armrest in an open position;

FIG. 3 is a schematic cross-sectional view of the console assembly of FIG. 1, depicting the armrest in different positions;

DETAILED DESCRIPTION

Figure 5:
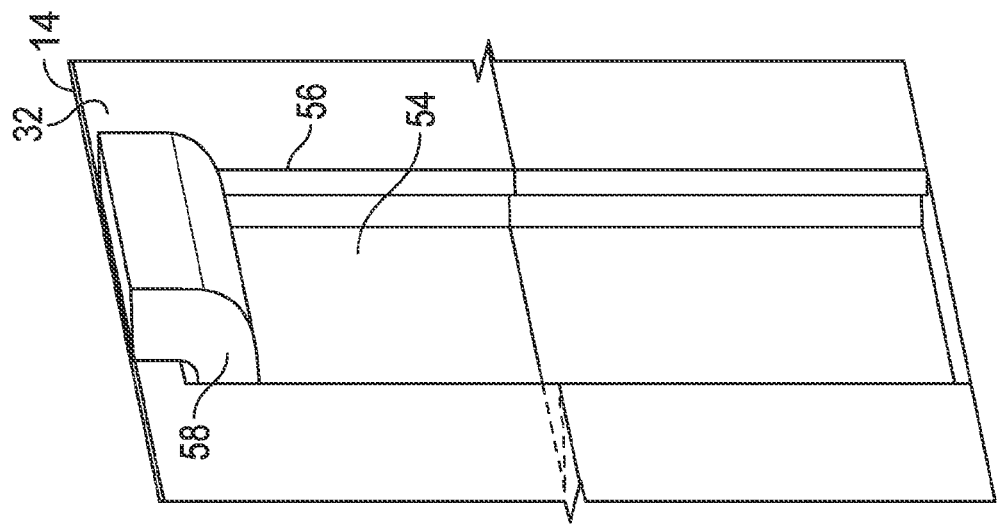
FIG. 5 is a schematic fragmentary, perspective view of the track of the console body and the armrest partly disposed in the track.

Referring to the drawings, wherein like reference numbers correspond to like or similar components throughout the several figures, and beginning with FIGS. 1 and 2, a vehicle 10 includes a console assembly 12 in its passenger compartment. The vehicle 10 may be an automotive vehicle, such as a car or a truck, or a non-automotive vehicle. Regardless of the kind of vehicle, the console assembly 12 may be disposed between two seats inside the passenger compartment of the vehicle 10 and may therefore be referred to as the center console. At the very least, the console assembly 12 is adjacent to one of the seats inside the passenger compartment of the vehicle 10.

The console assembly 12 includes a console body 14 for storing objects. The console body 14 defines an outer console surface 16 and an inner console surface 18 opposite the outer console surface 16. The inner console surface 18 defines an interior console cavity 20 configured, shaped, and sized to receive different kinds of objects. For example, the interior console cavity 20 can be configured, shaped, and sized to receive a purse, a bag, or any other suitable object. However, it is contemplated that the interior console cavity 20 can be specifically sized to receive objects larger or smaller than a purse. Irrespective of its size, the console body 14 defines the interior console cavity 20, which is capable of receiving objects. The interior console cavity 20 may be collectively defined by a first console wall 32, a second console wall 34, a third console wall 36, and a fourth console wall 38. The first console wall 32 and the third console wall 36 are substantially parallel to each other. The second console wall 34 is substantially parallel to the fourth console wall 38. The first console wall 32 and the third console wall 36 are substantially perpendicular to the second console wall 34 and the fourth console wall 38. Aside from the interior console cavity 20, the console assembly 12 may include cup holders 22 for holding cups.

In addition to the cup holders 22, the console assembly 12 includes an armrest 24 for covering the interior console cavity 20 and supporting an arm of a driver or passenger of the vehicle 10. The armrest 24 may have a substantially L-shape and includes a first armrest portion 26 and a second armrest portion 28 coupled to the first armrest portion 26. The second armrest portion 28 is substantially perpendicular to the first armrest portion 26 in order to allow the armrest 24 to support an arm when disposed in the closed position (FIG. 1) or the open position (FIG. 2).

Figure 4:
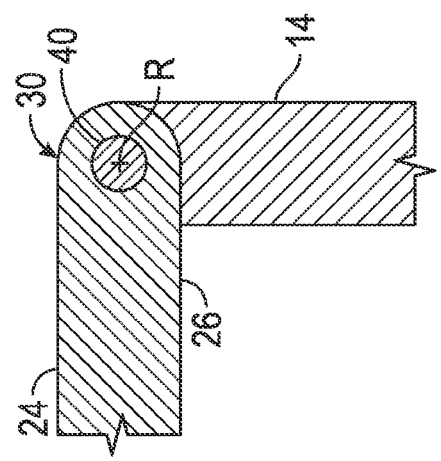
FIG. 4 is a schematic partial cross-sectional view of the armrest, the console body, and a pin rotatably coupling the armrest to the console body.

With reference to FIGS. 3 and 4, the armrest 24 is movably coupled to the console body 14 and can cover (or provide access to) the interior console cavity 20. Accordingly, the armrest 24 can be referred to as a lid. The first armrest portion 26 is rotatably coupled to the console body 14 and, therefore, the armrest 24 can rotate about an axis of rotation R (FIG. 1) between a closed, locked position (FIG. 1) and an open, unlocked position (FIG. 3). In the depicted embodiment, the console assembly 12 includes a hinge joint 30 pivotally coupling the armrest 24 to the console body 14. In particular, the first armrest portion 26 is directly (and pivotally) coupled to the console body 14. The hinge joint 30 includes at least one pin 40, such as a pivot pin, pivotally coupling the armrest 24 to the console body 14. The pin 40 extends along the axis of rotation R. The armrest 24 can rotate ninety (90) degrees relative to a horizontal axis H from the closed, locked position to the open, unlocked position.

In the closed, locked position, the armrest 24 can completely cover the interior console cavity 20, thereby preventing access to the interior console cavity 20. Further, the first armrest portion 26 is perpendicular to the first console wall 32, the second console wall 34 (FIG. 2), a third console wall 36, and a fourth console wall 38 (FIG. 2) and parallel to the horizontal axis H when the armrest is in the closed, locked position (FIG. 1). When the armrest 24 is in the closed, locked position, the second armrest portion 28 is parallel to the first console wall 32 and the third console wall 36 in order to completely cover the interior console cavity 20.

The console assembly 12 includes a closure mechanism 42 for maintaining the armrest 24 secured relative to the console body 14 in the closed, locked position (FIG. 1). The closure mechanism 42 includes a securing lever 44 rotatably coupled to the armrest 24. Specifically, the securing lever 44 is rotatably coupled to the second armrest portion 28 and is biased toward the console body 14. In particular, the securing lever 44 is biased toward a notch 46 defined in the third console wall 36 of the console body 14. The closure mechanism 42 includes a closing spring 48 coupled to the securing lever 44. The securing lever 44 includes a handle 50 and a securing protrusion 52 extending from the handle 50. The securing protrusion 52 is configured, shaped, and sized to be received in the notch 46 in order to lock the armrest 24 to the console body 14 in the closed, locked position. In operation, the closing spring 48 biases the securing lever 44 toward the console body 14 in the direction indicated by arrow S. To unlock the second armrest portion 28 of the armrest 24 from the console body 14, the securing lever 44 can be rotated away from the notch 46 in the direction indicated by arrow U.

After unlocking the second armrest portion 28 of the armrest 24 from the console body 14, the armrest 24 can be rotated ninety (90) degrees relative to the horizontal axis H from the closed, locked position to the open, unlocked position in the direction indicated by arrow N. When the armrest 24 is in the open, unlocked position, the interior console cavity 20 is accessible, the second armrest portion 28 is parallel to the horizontal axis H and perpendicular to the first console wall 32, and the first armrest portion 26 is parallel to the first console wall 32 and perpendicular to the horizontal axis H.

With reference to FIGS. 3 and 5, the console assembly 12 defines at least one track 54 extending into the outer surface 56 of the first console wall 32. The armrest 24 includes a guiding protrusion 58 configured, shaped, and sized to slide along the track 54. The guiding protrusion 58 extends from the first armrest portion 26. The track 54 can be configured as a groove and may have a substantially linear shape in order to allow linear movement of the armrest 24 in a downward direction D (FIG. 1).

During operation, after the armrest 24 is in the open, unlocked position, the armrest 24 can be linearly moved in the downward direction D in order to allow a vehicle's occupant to rest the arm on the second armrest portion 28 of the armrest 24. While the armrest 24 moves in the downward direction D, the second armrest portion 28 moves toward the interior console cavity 20 and the guiding protrusion 58 slides along the track 54. The armrest 24 should be moved in the downward direction D until a locking mechanism 60 (FIG. 6) secures the first armrest portion 26 to the console body 14 in the open, locked position.

Figure 6A:
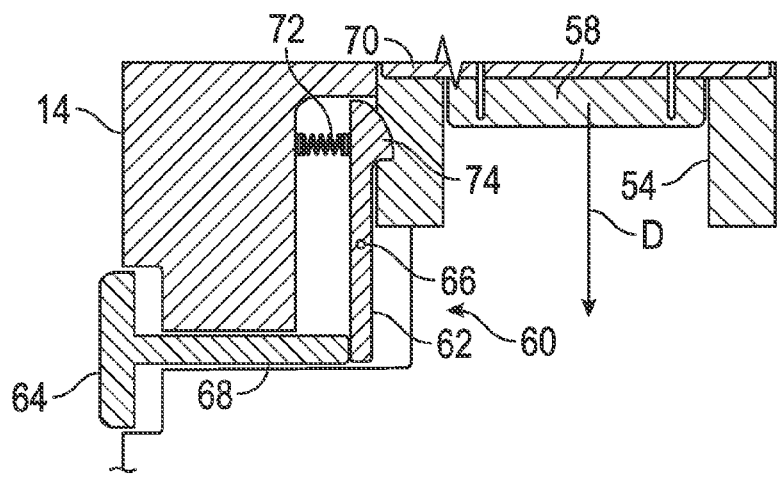
FIG. 6A is a schematic cross-sectional view of a locking mechanism for securing the armrest to the console body when the armrest is in the open position, depicting the locking mechanism disengaged from the armrest.
Figure 6B:
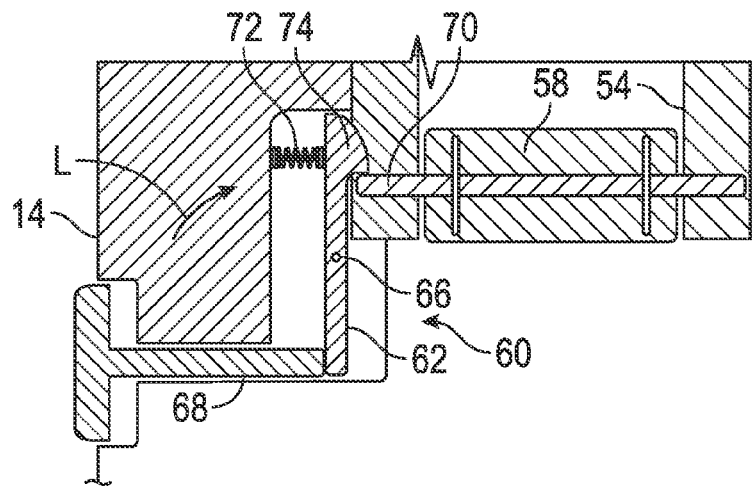
FIG. 6B is a schematic cross-sectional view of a locking mechanism for securing the armrest to the console body when the armrest is in the open position, depicting the locking mechanism engaged to the armrest.
Figure 6C:
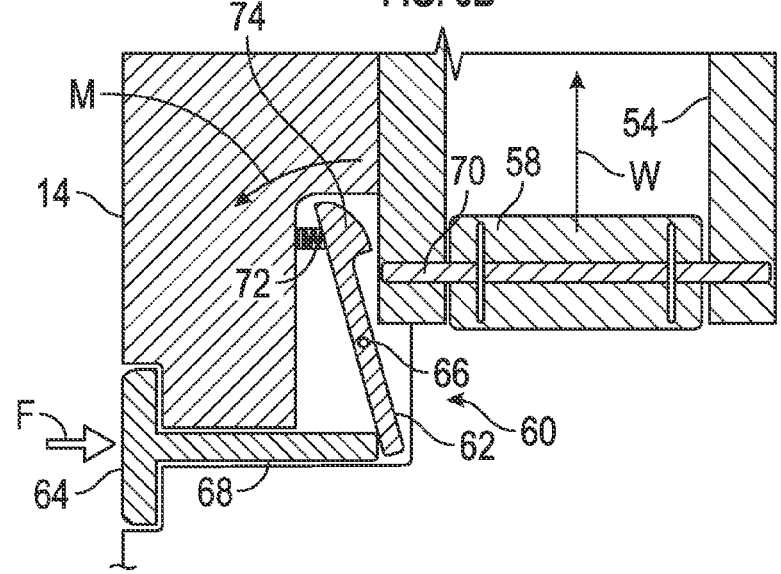
FIG. 6C is a schematic cross-sectional view of a locking mechanism for securing the armrest to the console body when the armrest is in the open position, depicting the locking mechanism being disengaged from the armrest.

With reference to FIGS. 6A, 6B, and 6C, the locking mechanism 60 includes a locking lever 62 and a button 64 coupled to the locking lever 62. The button 64 is movably coupled to the console body 14. The button 64 can be pressed (or otherwise actuated) to move the locking lever 62 from the locked position (FIG. 6B) to an unlocked position (FIG. 6C). Specifically, a force F can be applied to the button 64 in order to move the locking lever 62 between the locked and unlocked positions. A mechanism pin 66 rotationally couples the locking lever 62 to the console body 14, thereby allowing the locking lever 62 to pivot relative to the console body 14. A rod 68 operatively couples the button 64 to the locking lever 62. As such, pressing the button 64 causes the rod to 68 to push the locking lever 62. Consequently, pressing the button 64 causes the locking lever 62 to rotate about the mechanism pin 66 in the direction indicated by arrow M, away from the first armrest portion 26 of the armrest 24. Releasing the button 64 causes the locking lever 62 to rotate toward the first armrest portion 26 of the armrest 24 in the direction indicated by arrow L. The armrest 24 includes a locking extension 70 coupled to the guiding protrusion 58. The locking lever 62 can engage (e.g., contact) the locking extension 70 in order to lock the armrest in the open, locked position (FIG. 3).

The locking mechanism 60 includes a locking spring 72 coupled to the mechanism pin 66 in order to bias the locking lever 62 toward the locked position (FIG. 6C). As shown in FIG. 6A, when the first armrest portion 26 is moving in the downward direction D, the locking extension 70 can push the locking lever 62 (against the biasing force of the locking spring 72) in order to allow the locking extension 70 to be positioned underneath a locking portion 74 of the locking lever 62. The locking lever 62 is then biased toward the locked position (FIG. 6B) and the locking portion 74 engages the locking extension 70 in order to lock the armrest 24 in the open, unlocked position.

To unlock the armrest 24, the button 64 can be actuated (e.g., pressed) in order to move the locking lever 62 in the direction indicated by arrow M toward the unlocked position (FIG. 6C). Next, the armrest 24 can be moved in an upward direction W until the armrest 24 reaches the open, unlocked position. When the armrest 24 moves in the upward direction W, the second armrest portion 28 moves away from the interior console cavity 20. Then, the armrest 24 can be rotated about the axis of rotation R (FIG. 1) relative to the console body 14 in the direction indicated by arrow C in order to cover the interior console cavity 20. The armrest 24 should be rotated until the securing lever 44 engages the notch 46 in order to lock the armrest 24 to the console body 14 in the closed, locked position (FIG. 1).

While the best modes for carrying out the teachings have been described in detail, those familiar with the art to which this disclosure relates will recognize various alternative designs and embodiments for practicing the teachings within the scope of the appended claims.

The invention claimed is:

1. A console assembly, comprising:
a console body defining an interior console cavity, wherein the console body includes a console wall, the console wall includes an inner console surface and an outer console surface opposite the inner console surface, the inner console surface at least partially defines the interior console cavity, the outer console surface faces away the interior console cavity, the outer console surface is outside the interior console cavity, the console body defines at least one track extending into the outer console surface such that the at least one track is outside the interior console cavity, and the at least one track is configured as a linear groove defined along the outer console surface;
an armrest movably coupled to the console body, wherein the armrest is rotatable relative to the console body about an axis of rotation between a closed, locked position and an open, unlocked position, and the armrest is linearly movable relative to the console body between the open, unlocked position and an open, locked position, the armrest includes a guiding protrusion sized to be slidably disposed in the at least one track, and the at least one track is configured to guide a linear movement of the armrest between the open, unlocked position and the open, locked position;
wherein, in the closed, locked position, the armrest covers the interior console cavity of the console body;
wherein, when the armrest is in the open, unlocked position, the interior console cavity is accessible; and
wherein, when the armrest is in the open, locked position, the interior console cavity is accessible and the armrest is locked to the console body and positioned for supporting an arm of a vehicle occupant.

2. The console assembly of claim 1, further comprising a closure mechanism configured to lock the armrest to the console body in the closed, locked position, wherein the armrest has a substantially L-shape and includes a first armrest portion movably coupled to the console body and a second armrest portion coupled to the first armrest portion, the closure mechanism is coupled to the second armrest portion, the second armrest portion is substantially perpendicular to the first armrest portion, and the second armrest portion is configured to be coupled to the console body through the closure mechanism when the armrest is in the closed, locked position.

3. The console assembly of claim 2, wherein the armrest is movably coupled to the console body such that the second armrest portion is linearly movable relative to the console body toward and away from the interior console cavity.

4. The console assembly of claim 2, further comprising a hinge joint rotatably coupling the armrest to the console body.

5. The console assembly of claim 4, wherein the hinge joint includes at least one pin pivotally coupling the armrest to the console body.

6. The console assembly of claim 5, further comprising a locking mechanism configured to lock the armrest to the console body in the open, locked position and a closure mechanism configured to lock the armrest to the console body in the closed, locked position, wherein the console wall is a first console wall, the console body includes a second console wall, the second console wall defines an inner wall surface and an outer wall surface opposite the inner wall surface, the inner wall surface partially defines the interior console cavity, the outer wall surface faces away from the interior console cavity, the second armrest portion is coupled to the console wall at the outer wall surface when the armrest is in the closed, locked position, the closure mechanism includes a securing lever rotatably coupled to the second armrest portion, the securing lever includes a handle and a securing protrusion extending from the handle, the console body defines a notch extending into the outer wall surface, and the securing protrusion is sized to be received in the notch so as to lock the armrest to the console body when the armrest is in the closed, locked position.

7. The console assembly of claim 6, wherein the locking mechanism includes a locking lever movably coupled to the console body, the locking lever is movable relative to the console body between an unlocked position and a locked position, the locking lever engages the guiding protrusion when disposed in the locked position in order to maintain the armrest secured to the console body, and the locking mechanism further comprising a mechanism pin rotationally coupling the locking lever to the console body such that the locking lever is pivotable relative to the console body.

8. The console assembly of claim 7, wherein the locking lever is disengaged from the guiding protrusion when disposed in the unlocked position.

9. The console assembly of claim 8, further comprising a locking extension coupled to the guiding protrusion, wherein the locking lever is biased toward the locked position, and the locking lever is positioned relative to the console body such that the locking lever contacts the locking extension and locks the armrest to the console body only when the armrest is in the open, locked position.

10. The console assembly of claim 8, further comprising a button movably coupled to the console body and a rod coupled to the button, wherein the rod interconnects the locking lever and the button such that actuating the button causes the locking lever to move from the locked position to the unlocked position.

11. A vehicle, comprising:
a center console body defining an interior console cavity;
an armrest movably coupled to the center console body, wherein the armrest has a substantially L-shape and includes a first armrest portion and a second armrest portion coupled to the first armrest portion;
wherein the first armrest portion is rotatable relative to the center console body about an axis of rotation between a closed, locked position and an open, unlocked position, and the first armrest portion is linearly movable relative to the center console body between the open, unlocked position and an open, locked position such that the second armrest portion is linearly movable away and toward the interior console cavity;
a closure mechanism configured to lock the armrest to the center console body in the closed, locked position, wherein the closure mechanism is directly coupled to the second armrest portion;
wherein, in the closed, locked position, the armrest covers the interior console cavity of the center console body;
wherein, when the armrest is in the open, unlocked position, the interior console cavity is accessible;
wherein, when the armrest is in the open, locked position, the interior console cavity is accessible and the armrest is locked to the center console body and positioned for supporting an arm of a vehicle occupant; and
wherein the center console body includes a console wall, the console wall defines an inner wall surface and an outer wall surface opposite the inner wall surface, the inner wall surface partially defines the interior console cavity, the outer wall surface faces away from the interior console cavity, and the closure mechanism is directly coupled to the console wall at the outer wall surface when the armrest is in the closed, locked position such that the second armrest portion is coupled to the console wall at the outer wall surface through the closure mechanism when the armrest is in the closed, locked position.

12. The vehicle of claim 11, wherein the first armrest portion is perpendicular to the second armrest portion, and the second armrest portion is configured to be directly coupled to the center console body when the armrest is in the closed, locked position, and the second armrest portion is entirely disposed outside the interior console cavity when the armrest is in the closed, locked position.

13. The vehicle of claim 11, further comprising a hinge joint rotatably coupling the armrest to the center console body, wherein the center console body defines an opening leading into the interior console cavity, and the armrest completely covers the opening when the armrest is in the closed, locked position such that the interior console cavity is inaccessible.

14. The vehicle of claim 13, wherein the hinge joint includes at least one pin pivotably coupling the armrest to the center console body.

15. The vehicle of claim 14, wherein the center console body defines at least one track, the at least one track is disposed outside the interior console cavity, the armrest includes a guiding protrusion sized to be slidably disposed in the at least one track, and the at least one track is configured to guide a linear movement of the armrest between the open, unlocked position and the open, locked position.

16. The vehicle of claim 15, further comprising a locking mechanism configured to lock the armrest to the center console body only in the open, locked position and a closure mechanism configured to lock the armrest to the center console body only in the closed, locked position.

17. The vehicle of claim 16, wherein the locking mechanism includes a locking lever movably coupled to the center console body, the locking lever is movable relative to the center console body between an unlocked position and a locked position, and the locking lever is coupled to the guiding protrusion when disposed in the locked position in order to maintain the armrest secured to the center console body only when the armrest is in the open, locked position.

18. The vehicle of claim 17, wherein the locking lever is disengaged from the guiding protrusion when disposed in the unlocked position.

19. The vehicle of claim 18, wherein the locking lever is biased toward the locked position, the closure mechanism includes a securing lever rotatably coupled to the second armrest portion, the securing lever includes a handle and a securing protrusion extending from the handle, the center console body defines a notch extending into the outer wall surface, and the securing protrusion is sized to be received in the notch so as to lock the armrest to the center console body when the armrest is in the closed, locked position.

* * * * *